US011913449B2

(12) United States Patent
Suzuki et al.

(10) Patent No.: US 11,913,449 B2
(45) Date of Patent: Feb. 27, 2024

(54) SLIDING COMPONENT

(71) Applicant: EAGLE INDUSTRY CO., LTD., Tokyo (JP)

(72) Inventors: Hiroshi Suzuki, Tokyo (JP); Yuichiro Tokunaga, Tokyo (JP)

(73) Assignee: EAGLE INDUSTRY CO., LTD. (JP)

( * ) Notice: Subject to any disclaimer, the term of this patent is extended or adjusted under 35 U.S.C. 154(b) by 21 days.

(21) Appl. No.: 17/784,599

(22) PCT Filed: Dec. 16, 2020

(86) PCT No.: PCT/JP2020/046868
§ 371 (c)(1),
(2) Date: Jun. 10, 2022

(87) PCT Pub. No.: WO2021/125200
PCT Pub. Date: Jun. 24, 2021

(65) Prior Publication Data
US 2023/0013329 A1 Jan. 19, 2023

(30) Foreign Application Priority Data
Dec. 17, 2019 (JP) .................................. 2019-227365

(51) Int. Cl.
*F04C 18/02* (2006.01)
*F04C 29/02* (2006.01)
*F16J 15/18* (2006.01)

(52) U.S. Cl.
CPC .......... *F04C 18/0215* (2013.01); *F04C 29/02* (2013.01); *F16J 15/18* (2013.01)

(58) Field of Classification Search
None
See application file for complete search history.

(56) References Cited

U.S. PATENT DOCUMENTS

| 3,945,776 A | 3/1976 | Morita ........................ 418/142 |
| 4,637,786 A | 1/1987 | Matoba et al. ................. 418/55 |
| 2017/0146014 A1 | 5/2017 | Ohta et al. .......... F04C 29/0021 |
| 2019/0169988 A1 | 6/2019 | Tokunaga et al. ...... F01C 19/12 |
| 2020/0063560 A1 | 2/2020 | Tokunaga et al. ...... F01C 19/08 |
| 2020/0332901 A1 | 10/2020 | Imura .................. F16J 15/3412 |

FOREIGN PATENT DOCUMENTS

| JP | S52-36566 | 9/1977 | ............. F02B 55/02 |
| JP | 61008402 A * | 1/1986 | |
| JP | S61-8402 | 1/1986 | ............... F01C 1/02 |
| JP | 2-16381 | 1/1990 | ............. F04C 18/02 |
| JP | 02016381 A * | 1/1990 | |
| JP | H4-632289 | 12/1992 | ............. F04C 18/02 |

(Continued)

OTHER PUBLICATIONS

English Translation JP61008402A (Year: 1986).*
English Translation JP02016381A (Year: 1990).*
U.S. Appl. No. 17/783,256, filed Jun. 7, 2022, Suzuki at al.

(Continued)

*Primary Examiner* — Shafiq Mian
(74) *Attorney, Agent, or Firm* — HAYES SOLOWAY P.C.

(57) ABSTRACT

Provided is a sliding component capable of reducing the frictional resistance of a sliding surface entailing eccentric rotation. A sliding component is formed in an annular shape and has a sliding surface relatively sliding with eccentric rotation. A plurality of grooves not communicating with spaces on the inner and outer diameter sides of the sliding component are circumferentially provided in the sliding surface.

7 Claims, 4 Drawing Sheets

(56) References Cited

FOREIGN PATENT DOCUMENTS

| JP | H8-210285 | 8/1996 | ............... F04C 29/02 |
|----|-----------|--------|-----------------------------|
| JP | H9-88852 | 3/1997 | ............ F04C 18/356 |
| JP | 2002-39287 | 2/2002 | ............... F16H 1/32 |
| JP | 2006-316677 | 11/2006 | ............. F04C 18/02 |
| JP | 2013-72371 | 4/2013 | ............. F04C 15/00 |
| JP | 2016-61208 | 4/2016 | ............. F04C 18/02 |
| JP | WO 2018/025629 | 2/2018 | ............. F02B 55/02 |
| JP | WO 2018/097064 | 5/2018 | ............. F01C 19/08 |
| JP | WO 2019/139107 | 7/2019 | ............. F16J 15/34 |
| JP | 2019-196708 | 11/2019 | ............. F04C 18/02 |

OTHER PUBLICATIONS

U.S. Appl. No. 17/783,604, filed Jun. 10, 2022, Suzuki at al.
International Preliminary Report on Patentability issued in PCT/JP2020/046867, dated May 17, 2022, 5 pages.
International Search Report and Written Opinion issued in PCT/JP2020/046867, dated Feb. 22, 2021, with English translation, 13 pages.
International Preliminary Report on Patentability issued in PCT/JP2020/046868, dated May 17, 2022, 5 pages.
International Search Report and Written Opinion issued in PCT/JP2020/046868, dated Mar. 2, 2021, with English translation, 11 pages.
International Preliminary Report on Patentability issued in PCT/JP2020/046869, dated May 17, 2022, 5 pages.
International Search Report and Written Opinion issued in PCT/JP2020/046869, dated Feb. 22, 2021, with English translation, 15 pages.

\* cited by examiner

SLIDING COMPONENT

TECHNICAL FIELD

The present invention relates to a sliding component used in a rotating machine including an eccentric mechanism.

BACKGROUND ART

In the related art, a scroll compressor used in an automotive air conditioning system as an example of a rotating machine including an eccentric mechanism is provided with a scroll compression mechanism including a fixed scroll provided with a spiral lap on the surface of an end plate and a movable scroll provided with a spiral lap on the surface of an end plate, an eccentric mechanism eccentrically rotating a rotary shaft, and so on. In this mechanism, the movable scroll is slid relative to the fixed scroll with eccentric rotation by the rotation of the rotary shaft. As a result, the refrigerant supplied from a low-pressure chamber on the outer diameter side of both scrolls is pressurized and the high-pressure refrigerant is discharged from the discharge hole formed in the middle of the fixed scroll (see Patent Citation 1).

In addition, the scroll compressor illustrated in Patent Citation 1 is provided with a back pressure supply mechanism supplying a part of the refrigerant compressed by the scroll compression mechanism to a back pressure chamber formed on the back surface side of a thrust plate receiving the axial load of the movable scroll. The movable scroll is pressed toward the fixed scroll by the back pressure acting on the back surface of the movable scroll. As a result, the axial refrigerant leakage between the two scrolls is reduced and the compression efficiency of the scroll compressor is enhanced.

CITATION LIST

Patent Literature

Patent Citation 1: JP 2016-61208 A (Pages 5 to 6, FIG. 1)

SUMMARY OF INVENTION

Technical Problem

In the scroll compressor illustrated in Patent Citation 1, a seal ring is interposed between the thrust plate and a housing. As a result, the thrust plate can be axially moved while the back pressure is prevented from leaking out of the back pressure chamber. As a result, the movable scroll can be pressed toward the fixed scroll via the thrust plate. However, the sliding surface of the thrust plate is pressed against the back surface of the movable scroll, and thus the frictional resistance of the sliding surface is large and the operation of the movable scroll may be affected.

The present invention has been made in view of such a problem, and an object of the present invention is to provide a sliding component capable of reducing the frictional resistance of a sliding surface entailing eccentric rotation.

Solution to Problem

In order to solve the above problem, in a sliding component according to the present invention formed in an annular shape and having a sliding surface relatively sliding with eccentric rotation, a plurality of grooves communicating with neither a space on an inner diameter side of the sliding component nor a space on an outer diameter side of the sliding component are formed in the sliding surface so as to be arranged in a circumferential direction of the sliding component. According to the feature of the present invention, a fluid is capable of flowing into the groove from an external space through the space between sliding surfaces using the dynamic pressure generated in the groove provided in the sliding surface relatively sliding with eccentric rotation. In addition, the fluid held in the groove is unlikely to flow out from the space between the sliding surfaces toward the external space and dynamic pressure can be generated over the entire circumference between the sliding surfaces in accordance with the direction of the relative movement of the groove entailed by eccentric rotation. Accordingly, by slightly separating the sliding surfaces from each other and forming a fluid film, the lubricity between the sliding surfaces is improved and the frictional resistance of the sliding surface can be reduced.

It may be preferable that each of the grooves is formed in a circular shape. According to this preferable configuration, dynamic pressure can be stably generated in any direction of the relative movement of the groove entailed by eccentric rotation, and thus a well-balanced pressure distribution can be performed over the entire circumference between the sliding surfaces.

It may be preferable that each of the grooves has a geometric center in a radial middle of the sliding surface. According to this preferable configuration, the radial dimension of the sliding component can be small and the sliding component having a small sliding resistance can be provided.

It may be preferable that the sliding component is one of a pair of relatively sliding components having a smaller radial width. According to this preferable configuration, dynamic pressure can be reliably generated by the groove between the sliding surfaces sliding relative to each other with eccentricity.

DESCRIPTION OF EMBODIMENTS

Figure 1:
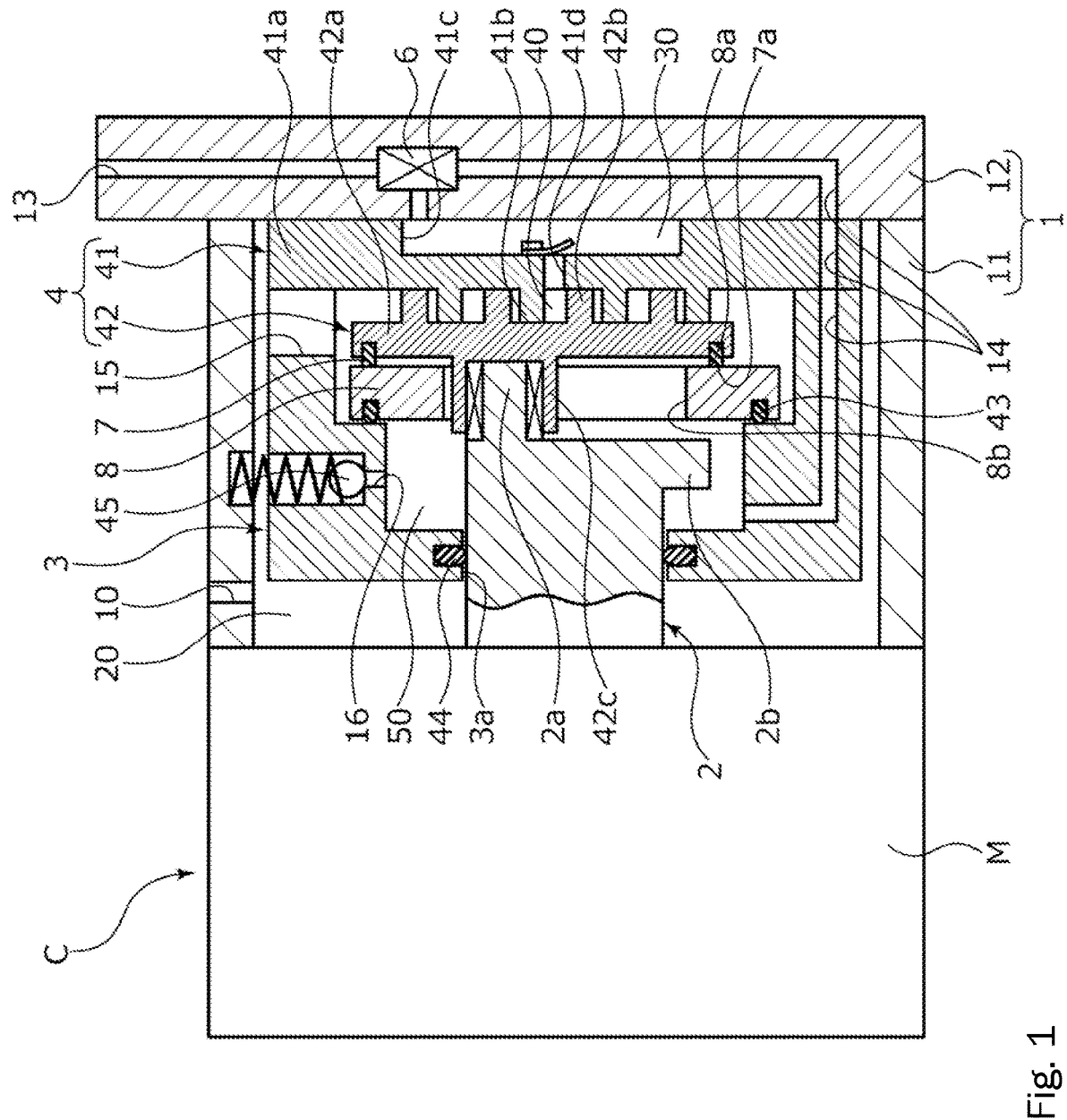
FIG. 1 is a schematic configuration diagram illustrating a scroll compressor to which a side seal as a sliding component according to an embodiment of the present invention is applied.

A mode for implementing the sliding component according to the present invention will be described below based on an embodiment.

Embodiment

The sliding component according to an embodiment of the present invention will be described with reference to FIGS. 1 to 3. In the drawings, the groove formed in the sliding surface of the sliding component or the like is dotted for convenience of description.

The sliding component of the present invention is applied to a rotating machine including an eccentric mechanism such as a scroll compressor C that suctions, compresses, and discharges a refrigerant as a fluid used in the air conditioning system of an automobile or the like. It should be noted that the refrigerant in the present embodiment is a gas mixed with a mist-like lubricating oil.

First, the scroll compressor C will be described. As illustrated in FIG. 1, the scroll compressor C mainly includes a housing 1, a rotary shaft 2, an inner casing 3, a scroll compression mechanism 4, a side seal 7 as a sliding component, a thrust plate 8, and a drive motor M.

The housing 1 includes a cylindrical casing 11 and a cover 12 blocking one opening of the casing 11. Formed in the casing 11 are a low-pressure chamber 20 where a low-pressure refrigerant is supplied through a suction port 10 from a refrigerant circuit (not illustrated), a high-pressure chamber 30 where a high-pressure refrigerant compressed by the scroll compression mechanism 4 is discharged, and a back pressure chamber 50 where a part of the refrigerant compressed by the scroll compression mechanism 4 is supplied together with lubricating oil. It should be noted that the back pressure chamber 50 is formed in the cylindrical inner casing 3 accommodated in the casing 11.

Formed in the cover 12 is a discharge communication passage 13 for communication between the refrigerant circuit (not illustrated) and the high-pressure chamber 30. In addition, a part of a back pressure communication passage 14 for communication between the high-pressure chamber 30 and the back pressure chamber 50 is formed in the cover 12 by branching off from the discharge communication passage 13. It should be noted that the discharge communication passage 13 is provided with an oil separator 6 for lubricating oil separation from a refrigerant.

The inner casing 3 is fixed with one axial end of the inner casing 3 abutting against an end plate 41a of a fixed scroll 41 constituting the scroll compression mechanism 4. In addition, in one end portion of the inner casing 3, a suction communication passage 15 penetrating it in the radial direction is formed. In other words, the low-pressure chamber 20 is formed from the outside of the inner casing 3 to the inside of the inner casing 3 via the suction communication passage 15. The refrigerant supplied to the inside of the inner casing 3 through the suction communication passage 15 is suctioned into the scroll compression mechanism 4.

The scroll compression mechanism 4 mainly includes the fixed scroll 41 fixed to the cover 12 in a substantially sealed shape and a movable scroll 42 accommodated in the inner casing 3.

The fixed scroll 41 is made of metal and includes a spiral lap 41b projecting from the surface of the disk-shaped end plate 41a, that is, one end surface of the end plate 41a. In addition, a recessed portion 41c recessed on the inner diameter side of the back surface of the end plate 41a, that is, the other end surface of the end plate 41a is formed in the fixed scroll 41 and the high-pressure chamber 30 is defined from the recessed portion 41c and the end surface of the cover 12.

The movable scroll 42 is made of metal and includes a spiral lap 42b projecting from the surface of a disk-shaped end plate 42a, that is, one axial end surface of the end plate 42a. In addition, a boss 42c protruding from the middle of the back surface of the end plate 42a, that is, the other end surface of the end plate 42a is formed on the movable scroll 42. An eccentric portion 2a formed in one end portion of the rotary shaft 2 is fitted into the boss 42c so as to be relatively rotatable. It should be noted that an eccentric mechanism causing the rotary shaft 2 to perform eccentric rotation is configured by the eccentric portion 2a of the rotary shaft 2 and a counterweight portion 2b protruding in the outer diameter direction from one end portion of the rotary shaft 2 in the present embodiment.

When the rotary shaft 2 is rotationally driven by the drive motor M, the eccentric portion 2a rotates eccentrically and the movable scroll 42 slides relative to the fixed scroll 41 with the eccentric rotation. At this time, the movable scroll 42 rotates eccentrically with respect to the fixed scroll 41. With this rotation, the contact positions of the laps 41b and 42b sequentially move in the rotation direction and a compression chamber 40 formed between the laps 41b and 42b gradually shrinks while moving toward the middle. As a result, the refrigerant suctioned into the compression chamber 40 from the low-pressure chamber 20 formed on the outer diameter side of the scroll compression mechanism 4 is compressed and, finally, the high-pressure refrigerant is discharged to the high-pressure chamber 30 through a discharge hole 41d provided in the middle of the fixed scroll 41.

Next, the side seal 7 as a sliding component in the present embodiment will be described. As illustrated in FIGS. 1 and 2, the side seal 7 is made of resin, has a rectangular cross section and an annular shape in the axial direction, and is fixed to the back surface of the end plate 42a of the movable scroll 42. A sliding surface 7a abutting against a sliding surface 8a of the thrust plate 8 is formed on one side surface of the side seal 7.

Figure 2:
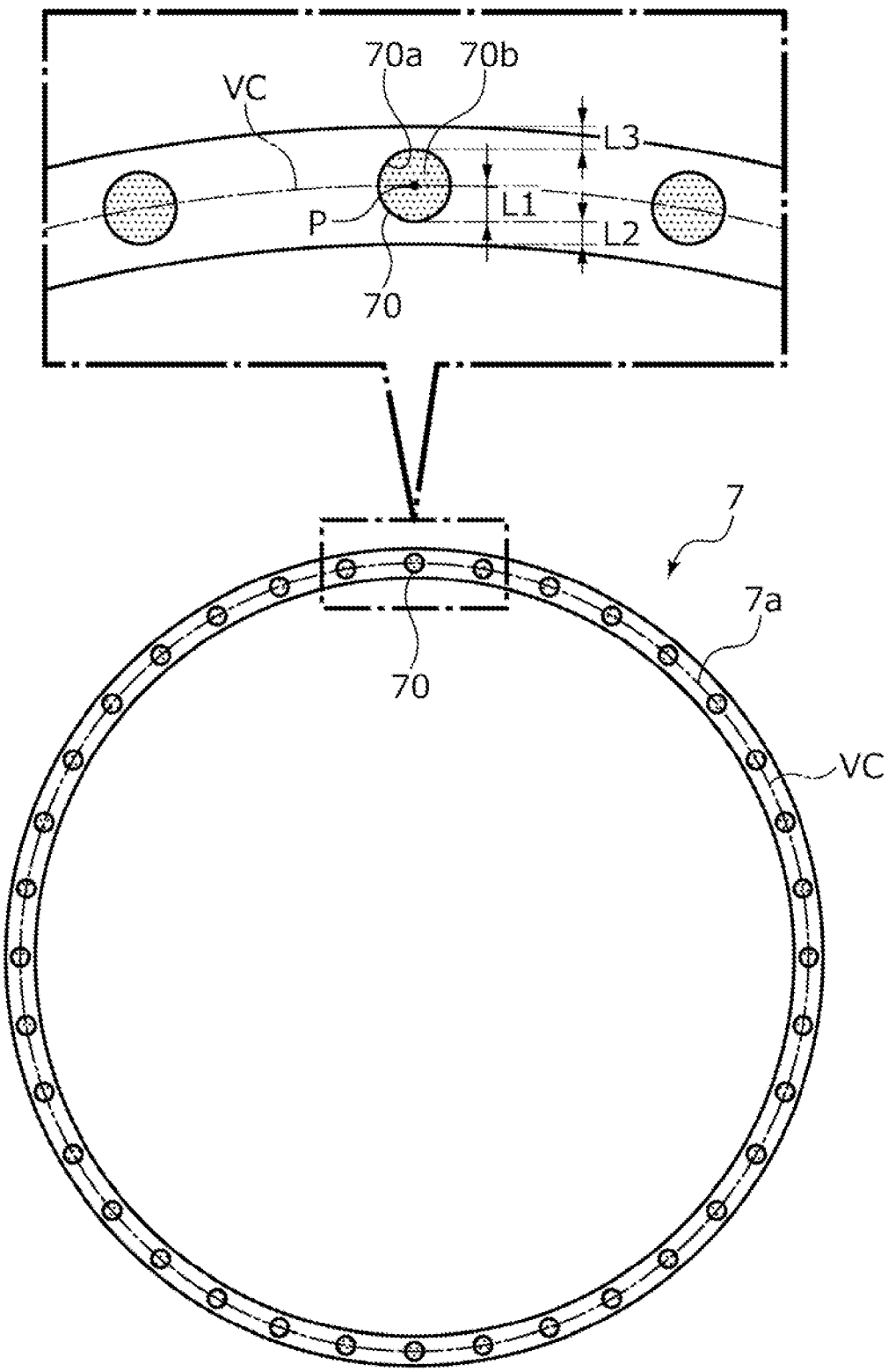
FIG. 2 is a diagram illustrating a sliding surface of the side seal according to the embodiment of the present invention.

As illustrated in FIG. 2, in the sliding surface 7a of the side seal 7, a plurality of grooves 70 communicating with neither the space on the inner diameter side nor the space on the outer diameter side, that is, communicating with neither the back pressure chamber 50 nor the low-pressure chamber 20 are equally arranged in the circumferential direction.

The groove 70 is formed in a circular shape having a center P as a geometric center on a virtual circle VC as the radial middle of the sliding surface 7a. It should be noted that the average of the inner and outer diameters of the sliding surface 7a is an example of the radial middle and yet the radial middle may not be a mathematical average and L2 (described later) may be 50% to 200% of L3.

Specifically, the groove 70 includes a circular wall surface 70a extending in the axial direction so as to be orthogonal to the flat sliding surface 7a and a planar bottom surface 70b extending in parallel to the sliding surface 7a.

It should be noted that the bottom surface 70b of the groove 70 is not limited to the planar bottom surface extending in parallel to the sliding surface 7a and may be formed as, for example, an inclined surface or a curved surface.

In addition, a radial dimension L1 of the groove 70 is longer than the radial dimension L2 of the land part between the inner periphery of the sliding surface 7a and the wall surface 70a (L1>L2).

It should be noted that the groove 70 is formed in a circular shape having a single radius and having the center P in the radial middle of the sliding surface 7a and thus the radial dimension L3 of the land part between the outer periphery of the sliding surface 7a and the wall surface 70a is equal to L2 (L2=L3). As a result, the capacity for holding a fluid in the groove 70 is large between the sliding surfaces 7a and 8a.

As illustrated in FIG. 1, the thrust plate 8 is made of metal and has an annular shape, a seal ring 43 is fixed to one end surface of the thrust plate 8, and the seal ring 43 abuts against the inner peripheral surface of the inner casing 3. As a result, the thrust plate 8 functions as a thrust bearing that receives the axial load of the movable scroll 42 via the side seal 7.

In addition, the side seal 7 and the seal ring 43 partition the low-pressure chamber 20 formed on the outer diameter side of the movable scroll 42 and the back pressure chamber 50 formed on the back surface side of the movable scroll 42 in the inner casing 3. The back pressure chamber 50 is formed as a closed space by sealing between the back pressure chamber 50 and the rotary shaft 2 inserted through a through hole 3a by a seal ring 44, which is fixed to the inner periphery of the through hole 3a provided in the middle of the other end of the inner casing 3. In addition, the back pressure communication passage 14 formed over the cover 12, the fixed scroll 41, and the inner casing 3 and allowing the high-pressure chamber 30 and the back pressure chamber 50 to communicate with each other is provided with an orifice (not illustrated) and the refrigerant in the high-pressure chamber 30 is supplied, after pressure-decreasing adjustment by the orifice, to the back pressure chamber 50 together with the lubricating oil separated by the oil separator 6. At this time, the pressure in the back pressure chamber 50 is adjusted so as to become higher than the pressure in the low-pressure chamber 20. It should be noted that a pressure release hole 16 penetrating the inner casing 3 in the radial direction and allowing the low-pressure chamber 20 and the back pressure chamber 50 to communicate with each other is formed in the inner casing 3 and a pressure adjustment valve 45 is provided in the pressure release hole 16. The pressure adjustment valve 45 is opened by the pressure of the back pressure chamber 50 exceeding a set value.

In addition, the boss 42c of the movable scroll 42 is inserted through a through hole 8b in the middle of the thrust plate 8. The through hole 8b has the size of a diameter that allows eccentric rotation by the eccentric portion 2a of the rotary shaft 2 fitted into the boss 42c. In other words, the sliding surface 7a of the side seal 7 is capable of sliding relative to the sliding surface 8a of the thrust plate 8 with eccentricity by the eccentric rotation of the rotary shaft 2 (see FIG. 3).

It should be noted that FIGS. 3A to 3D in FIG. 3 illustrate the rotational trajectory of the boss 42c that is viewed from the fixed scroll 41 (see FIG. 1) side.

Figure 3A:
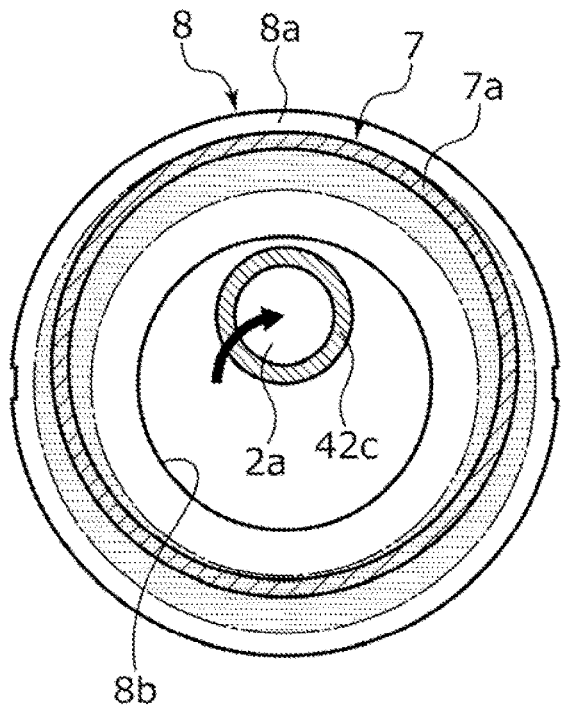
FIG. 3 is a diagram illustrating relative sliding between the sliding surface of the side seal and a sliding surface of a thrust plate according to the embodiment of the present invention. It should be noted that FIG. 3A illustrates the start position of the relative sliding
FIGS. 3B to 3D illustrate the positional relationships between the relatively sliding surfaces of the side seal and the thrust plate at an eccentric rotary shaft rotation of 90, 180, and 270 degrees, respectively.
Figure 3B:
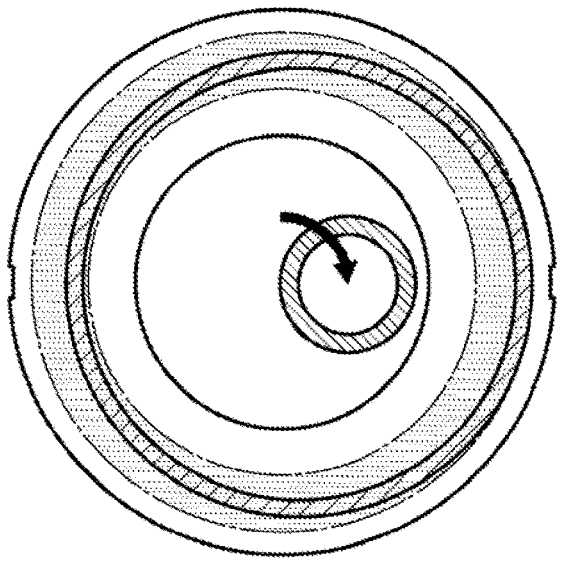
Figure 3C:
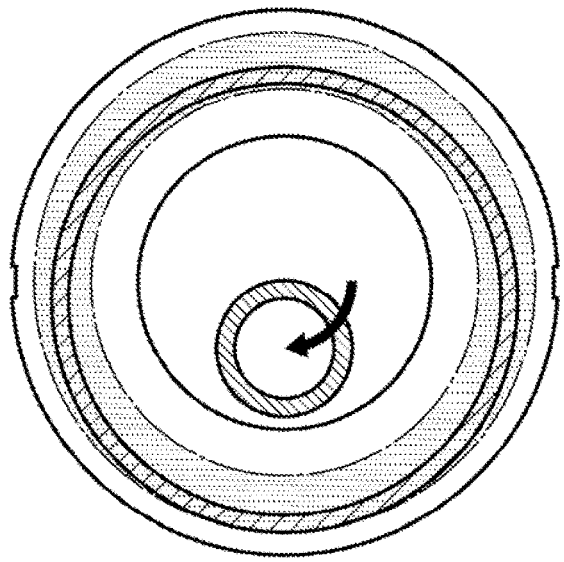
Figure 3D:
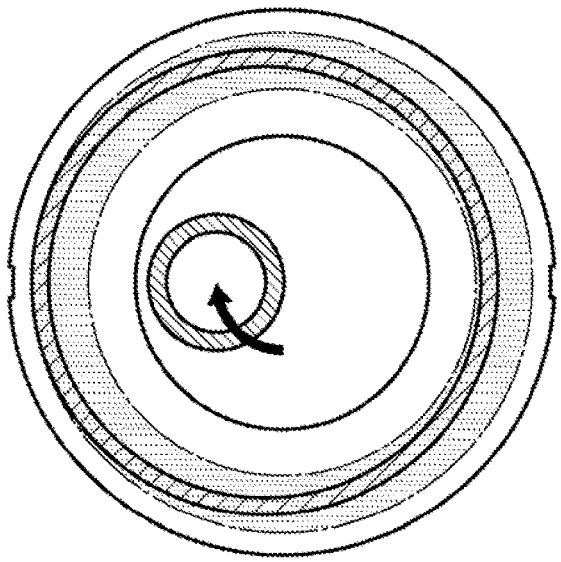

Respectively illustrated in FIGS. 3B to 3D are the boss 42c rotated by 90 degrees, 180 degrees, and 270 degrees with FIG. 3A serving as the clockwise reference. In addition, the sliding region between the sliding surface 7a of the side seal 7 and the sliding surface 8a of the thrust plate 8 is schematically illustrated by dots. In addition, regarding the rotary shaft 2, the counterweight portion 2b constituting the eccentric mechanism and so on are not illustrated and only the eccentric portion 2a fitted into the boss 42c is illustrated for convenience of description.

As described above, the side seal 7 is a sliding component having the sliding surface 7a sliding relative to the sliding surface 8a of the thrust plate 8 with eccentric rotation, the plurality of grooves 70 are circumferentially provided in the sliding surface 7a of the side seal 7, and the grooves 70 communicate with neither the fluid-present back pressure chamber 50 nor the fluid-present low-pressure chamber 20 on the inner and outer diameter sides. According to this, a fluid is capable of flowing into the groove 70 from the back pressure chamber 50 through the space between the sliding surfaces 7a and 8a using the dynamic pressure generated in the groove 70 provided in the sliding surface 7a relatively sliding with eccentric rotation. In addition, since the groove 70 communicates with neither the back pressure chamber 50 nor the low-pressure chamber 20, the fluid held in the groove 70 is unlikely to flow out from the space between the sliding surfaces 7a and 8a toward the low-pressure chamber 20 and the fluid is easily held in the groove 70. Accordingly, poor lubrication is unlikely to occur between the sliding surfaces 7a and 8a and dynamic pressure can be stably generated over the entire circumference between the sliding surfaces 7a and 8a in accordance with the relative movement of the groove 70 entailed by eccentric rotation. In addition, by slightly separating the sliding surfaces 7a and 8a from each other and forming a liquid film attributable to lubricating oil, the lubricity between the sliding surfaces 7a and 8a is improved and the frictional resistance of the sliding surface 7a can be reduced.

In addition, the plurality of grooves 70 are provided in the circumferential direction and are formed in a circular shape. According to this, dynamic pressure can be stably generated in every groove 70 in accordance with the relative movement of the groove 70 entailed by eccentric rotation and a well-balanced pressure distribution can be performed over the entire circumference between the sliding surfaces 7a and 8a. In addition, the distribution of the pressure generated in the plurality of grooves 70 as a result of the relative movement of the groove 70 entailed by the eccentric rotation of the rotary shaft 2 moves in a substantially circumferential direction with the eccentric rotation. Accordingly, the fluid that has flowed out between the sliding surfaces 7a and 8a from the groove 70 upstream in the circumferential direction as a result of the generation of the dynamic pressure is likely to flow into the adjacent groove 70 downstream in the circumferential direction and a liquid film attributable to lubricating oil is likely to be formed substantially uniformly and in a well-balanced manner over the circumferential direction between the sliding surfaces 7a and 8a. In addition, since the bias of the pressure distribution is reduced over the entire circumference between the sliding surfaces 7a and 8a, the inclination of the surface between the sliding surfaces 7a and 8a can be suppressed.

In addition, the groove 70 is formed in a circular shape having the center P (see FIG. 2) as a geometric center on the virtual circle VC as the radial middle of the sliding surface 7a. According to this, the radial dimension of the sliding component can be small and the sliding component having a small sliding resistance can be provided.

In addition, the radial dimension L1 of the groove 70 is longer than the radial dimension L2 of the land part between the inner periphery of the sliding surface 7a and the wall surface 70a (L1>L2). According to this, a fluid easily flows into the groove 70 from the back pressure chamber 50 through the space between the sliding surfaces 7a and 8a using dynamic pressure.

In addition, the radial width of the side seal 7 where the groove 70 is formed in the sliding surface 7a is smaller than the radial width of the relatively sliding thrust plate 8 (see FIGS. 1 and 3). According to this, between the sliding surfaces 7a and 8a sliding relative to each other with the eccentric rotation, the entire sliding surface 7a of the side seal 7 is always positioned in the sliding region between the sliding surface 7a of the side seal 7 and the sliding surface 8a of the thrust plate 8 (See FIG. 3). As a result, dynamic pressure can be reliably generated by the groove 70.

Although an embodiment of the present invention has been described above with reference to the drawings, the specific configurations are not limited to the embodiment and any changes or additions within the scope of the present invention are included in the present invention.

Although an aspect in which the side seal 7 as a sliding component is applied to the scroll compressor C used in the air conditioning system of an automobile or the like has been described in the above embodiment, the present invention is not limited thereto and the side seal 7 as a sliding component may be applied to, for example, a scroll expansion compressor provided integrally with an expander and a compressor insofar as it is a rotating machine including an eccentric mechanism.

In addition, each of the fluids in the spaces inside and outside the sliding surface of the sliding component may be any of a gas, a liquid, and a gas-liquid mixture.

In addition, although the groove 70 in the above embodiment is formed in a circular shape, the present invention is not limited thereto. The groove may be one that communicates with neither the inner diameter side nor the outer diameter side and, for example, the groove may be formed in an elliptical shape or a polygonal shape. In this case, the groove is preferably formed in an elliptical shape or a polygonal shape having the center P as a geometric center on the virtual circle VC as the radial middle of the sliding surface 7a as in the above embodiment.

In addition, although the groove 70 formed in the sliding surface 7a of the side seal 7 is formed in a circular shape having the center P as a geometric center on the virtual circle VC as the radial middle of the sliding surface 7a in the above embodiment, the present invention is not limited thereto. For example, the groove 70 may be formed in a circular shape having its center on the high-pressure side as compared with the radial middle of the sliding surface. According to this, a fluid easily flows into the groove from the space on the high-pressure side through the space between the sliding surfaces using dynamic pressure.

Figure 4:
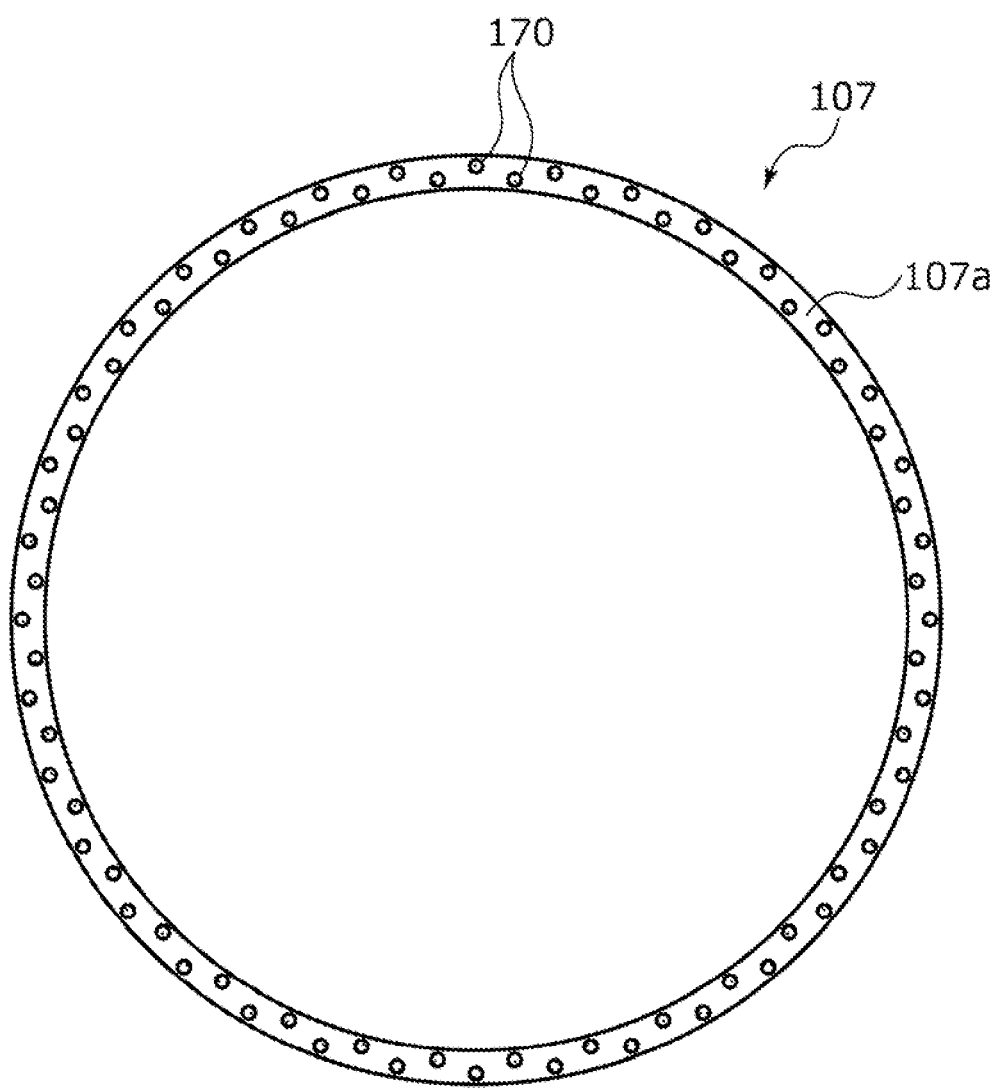
FIG. 4 is a diagram illustrating a modification example of the groove that is formed in the sliding surface of the side seal.

In addition, as in a side seal 107 of the modification example that is illustrated in FIG. 4, a plurality of grooves 170 may be provided in a staggered manner in the circumferential direction by the grooves 170 being formed in a circular shape and having the respective centers thereof on the inner and outer diameter sides of a sliding surface 107a.

In addition, although an aspect in which the low-pressure chamber 20 is formed on the outer diameter side of the sliding surface 7a and the back pressure chamber 50 higher in pressure than the low-pressure chamber is formed on the inner diameter side has been described as to the side seal 7 in the above embodiment, the present invention is not limited thereto. The side seal 7 may be used in an environment in which the outer diameter side of the sliding surface 7a is high in pressure and the inner diameter side is low in pressure. In addition, insofar as the sliding component of the present invention has a sliding surface relatively sliding with eccentric rotation, the sliding component of the present invention may be used in an environment in which the pressure inside the sliding surface and the pressure outside the sliding surface are substantially the same without being limited to an environment in which the pressure inside the sliding surface and the pressure outside the sliding surface differ from each other. In addition, the sliding component of the present invention does not have to function as a seal and may be one capable of reducing friction on a sliding surface.

In addition, although the side seal 7 having the relatively sliding surface 7a is made of resin and the thrust plate 8 having the relatively sliding surface 8a is made of metal in the above embodiment, the material of the sliding component may be freely selected in accordance with the environment of use and so on.

In addition, although an aspect in which the groove 70 is formed in the sliding surface 7a of the side seal 7 has been described in the above embodiment, the present invention is not limited thereto. A groove may be formed in the sliding region of the sliding surface 8a of the thrust plate 8 (see FIG. 3), which is a sliding component having a sliding surface relatively sliding with eccentric rotation. In addition, grooves may be formed in both the sliding surface 7a of the side seal 7 and the sliding surface 8a of the thrust plate 8.

In addition, although a configuration in which the sliding surface 7a of the side seal 7 as a sliding component and the sliding surface 8a of the thrust plate 8 as a sliding component slide relative to each other with eccentric rotation has been described in the above embodiment, the present invention is not limited thereto. A groove may be formed in the sliding surface relatively sliding with eccentric rotation with only one of the side seal and the thrust plate provided. For example, in a case where only the thrust plate is provided, grooves may be formed in one or both of the sliding surface of the thrust plate as a sliding component and the back surface of the end plate of the movable scroll. In addition, in a case where only the side seal is provided, a groove may be formed in the sliding surface of the side seal as a sliding component. In this case, the side seal also functions as a thrust bearing that abuts against the inner peripheral surface of the inner casing and receives the axial load of the movable scroll.

In a case where the side seal and the thrust plate are not provided and the back surface of the end plate of the movable scroll functions as a thrust bearing that abuts against the inner peripheral surface of the inner casing and receives the axial load of the movable scroll, a groove may be formed in the sliding surface formed on the back surface of the end plate of the movable scroll.

REFERENCE SIGNS LIST

1 Housing
2 Rotary shaft
2a Eccentric portion
3 Inner casing
4 Scroll compression mechanism
6 Oil separator
7 Side seal (sliding component)
7a Sliding surface
8 Thrust plate
8a Sliding surface
10 Suction port
13 Discharge communication passage
14 Back pressure communication passage
15 Suction communication passage
20 Low-pressure chamber
30 High-pressure chamber
40 Compression chamber
41 Fixed scroll
42 Movable scroll
50 Back pressure chamber
70 Groove
70a Wall surface
70b Bottom surface
107 Side seal (sliding component)
107a Sliding surface
170 Groove
C Scroll compressor
M Drive motor
P Center

The invention claimed is:

1. A sliding component having a sliding surface and formed in an annular shape, the sliding component being installed in a rotating machine such that the sliding surface is relatively slidable with eccentric rotation with respect to a sliding surface of a counterpart sliding component, wherein a plurality of grooves communicating with neither a space on an inner diameter side of the sliding component nor a space on an outer diameter side of the sliding component are formed in the sliding surface of the sliding component so as to be arranged in a circumferential direction of the sliding component, the groove has a bottom surface which continuously extends throughout the bottom portion of the groove, the groove is larger in radial width than part of a land which is formed on a high-pressure side in a radial direction with respect to the groove, and another part of the land which is formed on a low-pressure side in the radial direction with respect to the groove continuously extends to the low-pressure side.

2. The sliding component according to claim 1, wherein each of the grooves is formed in a circular shape.

3. The sliding component according to claim 1, wherein each of the grooves has a geometric center in a radial middle of the sliding surface.

4. The sliding component according to claim 1, wherein the sliding component is smaller than the counterpart sliding component in radial width.

5. The sliding component according to claim 2, wherein each of the grooves has a geometric center in a radial middle of the sliding surface.

6. The sliding component according to claim 2, wherein the sliding component is one of a pair of relatively sliding components is smaller than the counterpart sliding component in radial width.

7. The sliding component according to claim 3, wherein the sliding component is smaller than the counterpart sliding component in radial width.

* * * * *

UNITED STATES PATENT AND TRADEMARK OFFICE
CERTIFICATE OF CORRECTION

PATENT NO. : 11,913,449 B2
APPLICATION NO. : 17/784599
DATED : February 27, 2024
INVENTOR(S) : Suzuki et al.

It is certified that error appears in the above-identified patent and that said Letters Patent is hereby corrected as shown below:

On the Title Page

Item (56), last Publication, "U.S. Appl. No. 17/783,256, filed Jun. 7, 2022, Suzuki at al." should be --U.S. Appl. No. 17/783,256, filed Jun. 7, 2022, Suzuki et al.--.
Page 2, item (56) first Publication, "U.S. Appl. No. 17/783,604, filed Jun. 10, 2022, Suzuki at al." should be --U.S. Appl. No. 17/784,604, filed Jun. 10, 2022, Suzuki et al.--.

Signed and Sealed this
Twenty-second Day of October, 2024

Katherine Kelly Vidal
*Director of the United States Patent and Trademark Office*